US010705721B2

(12) United States Patent
Sathish et al.

(10) Patent No.: US 10,705,721 B2
(45) Date of Patent: Jul. 7, 2020

(54) METHOD AND SYSTEM FOR PROVIDING TOPIC VIEW IN ELECTRONIC DEVICE

(71) Applicant: SAMSUNG ELECTRONICS CO., LTD., Suwon-si (KR)

(72) Inventors: Sailesh Kumar Sathish, Bangalore (IN); Vinod Keshav Seetharamu, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 312 days.

(21) Appl. No.: 15/412,456

(22) Filed: Jan. 23, 2017

(65) Prior Publication Data

US 2017/0212671 A1  Jul. 27, 2017

(30) Foreign Application Priority Data

Jan. 21, 2016 (IN) .............................. 201641002313
Sep. 14, 2016 (IN) .............................. 201641002313

(51) Int. Cl.
*G06F 3/0488* (2013.01)
*G06F 3/0486* (2013.01)
*G06Q 50/00* (2012.01)
*G06Q 10/00* (2012.01)

(52) U.S. Cl.
CPC ........ *G06F 3/04883* (2013.01); *G06F 3/0486* (2013.01); *G06Q 10/00* (2013.01); *G06Q 50/01* (2013.01); *G06F 2203/04808* (2013.01)

(58) Field of Classification Search
CPC ........ G06Q 10/10; G06Q 10/00; G06Q 50/01; G06F 17/30864; G06F 17/2705; G06F 2216/15; G06F 2203/04808; H04L 51/32; H04L 51/043; H04L 67/22; H04N 21/4788
See application file for complete search history.

(56) References Cited

U.S. PATENT DOCUMENTS

| | | | |
|---|---|---|---|
| 8,026,918 B1 * | 9/2011 | Murphy ................. | G06N 3/006 345/473 |
| 8,788,949 B2 * | 7/2014 | Hunt ...................... | G06Q 10/10 709/206 |
| 8,886,655 B1 * | 11/2014 | Nandy .............. | G06F 17/30994 707/749 |
| 9,047,283 B1 * | 6/2015 | Zhang ............... | G06F 17/30663 |

(Continued)

*Primary Examiner* — Andrew L Tank
(74) *Attorney, Agent, or Firm* — Sughrue Mion, PLLC

(57) ABSTRACT

Embodiments herein provide a method for providing a topic view using an electronic device. The method includes detecting, by a gesture detection unit of the electronic device, a user input on content displayed on a display of the electronic device. Further, the method includes identifying a topic of the content displayed on a display of the electronic device. Further, the method includes determining, by a controller of the electronic device, a degree of similarity between the identified topic and at least one topic related to at least one content displayed on at least one external electronic device corresponding to at least one contact item stored in the electronic device. Further, the method includes displaying a topic view on the display of the electronic device based on the degree of similarity, wherein the topic view comprises at least one indicator indicating the at least one contact item corresponding to at least one topic included in the topic view.

20 Claims, 15 Drawing Sheets

(56) References Cited

U.S. PATENT DOCUMENTS

| | | | | |
|---|---|---|---|---|
| 2005/0076103 A1* | 4/2005 | Hilf | ............... | G06Q 10/10 709/220 |
| 2006/0026233 A1* | 2/2006 | Tenembaum | ............... | A63F 13/12 709/205 |
| 2007/0011617 A1* | 1/2007 | Akagawa | ............... | G06F 3/04815 715/738 |
| 2007/0288563 A1* | 12/2007 | Karkanias | ............... | G06F 17/30873 709/204 |
| 2008/0222295 A1* | 9/2008 | Robinson | ............... | G06F 17/30867 709/227 |
| 2009/0164897 A1* | 6/2009 | Amer-Yahia | ............... | G06F 17/30867 715/703 |
| 2009/0249244 A1* | 10/2009 | Robinson | ............... | G06F 3/0481 715/781 |
| 2009/0300518 A1* | 12/2009 | Mock | ............... | G06Q 10/10 715/753 |
| 2009/0319907 A1* | 12/2009 | Tokuda | ............... | G06Q 10/10 715/739 |
| 2009/0325602 A1* | 12/2009 | Higgins | ............... | H04W 4/02 455/456.2 |
| 2010/0023506 A1* | 1/2010 | Sahni | ............... | G06F 17/30867 707/E17.014 |
| 2010/0037153 A1* | 2/2010 | Rogers | ............... | G06F 3/0481 715/758 |
| 2010/0088607 A1* | 4/2010 | Dumpeti | ............... | G06Q 10/10 715/739 |
| 2010/0205541 A1* | 8/2010 | Rapaport | ............... | G06Q 10/10 715/753 |
| 2011/0282959 A1* | 11/2011 | Anderson | ............... | G06Q 10/107 709/206 |
| 2012/0005224 A1* | 1/2012 | Ahrens | ............... | H04W 4/21 707/769 |
| 2012/0066312 A1* | 3/2012 | Kandekar | ............... | G06F 17/30144 709/205 |
| 2012/0296967 A1* | 11/2012 | Tao | ............... | G06Q 30/0251 709/204 |
| 2014/0108372 A1* | 4/2014 | Oh | ............... | G06F 17/3089 707/706 |
| 2015/0039982 A1* | 2/2015 | Bastide | ............... | G06F 17/30864 715/205 |

* cited by examiner

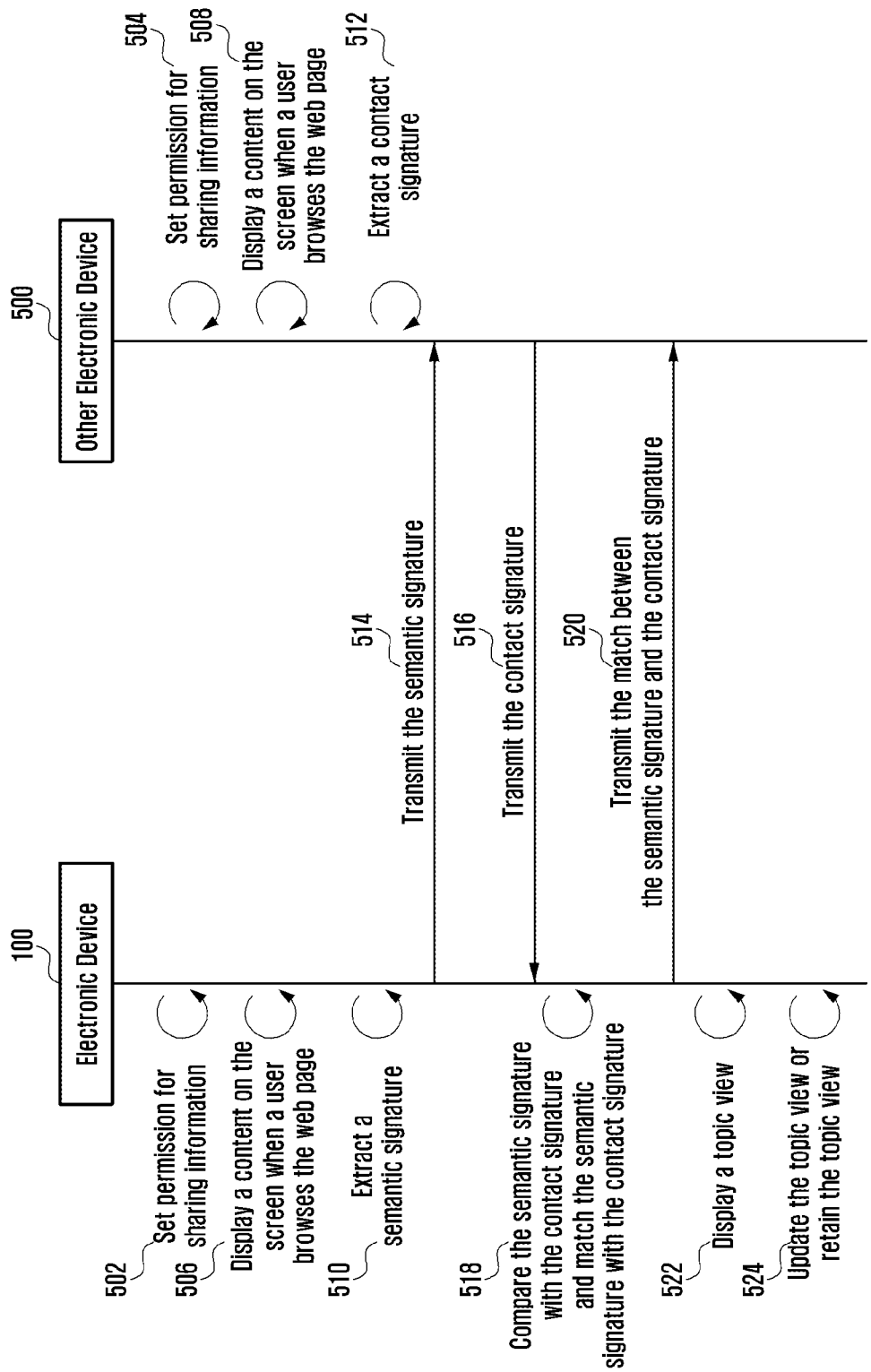

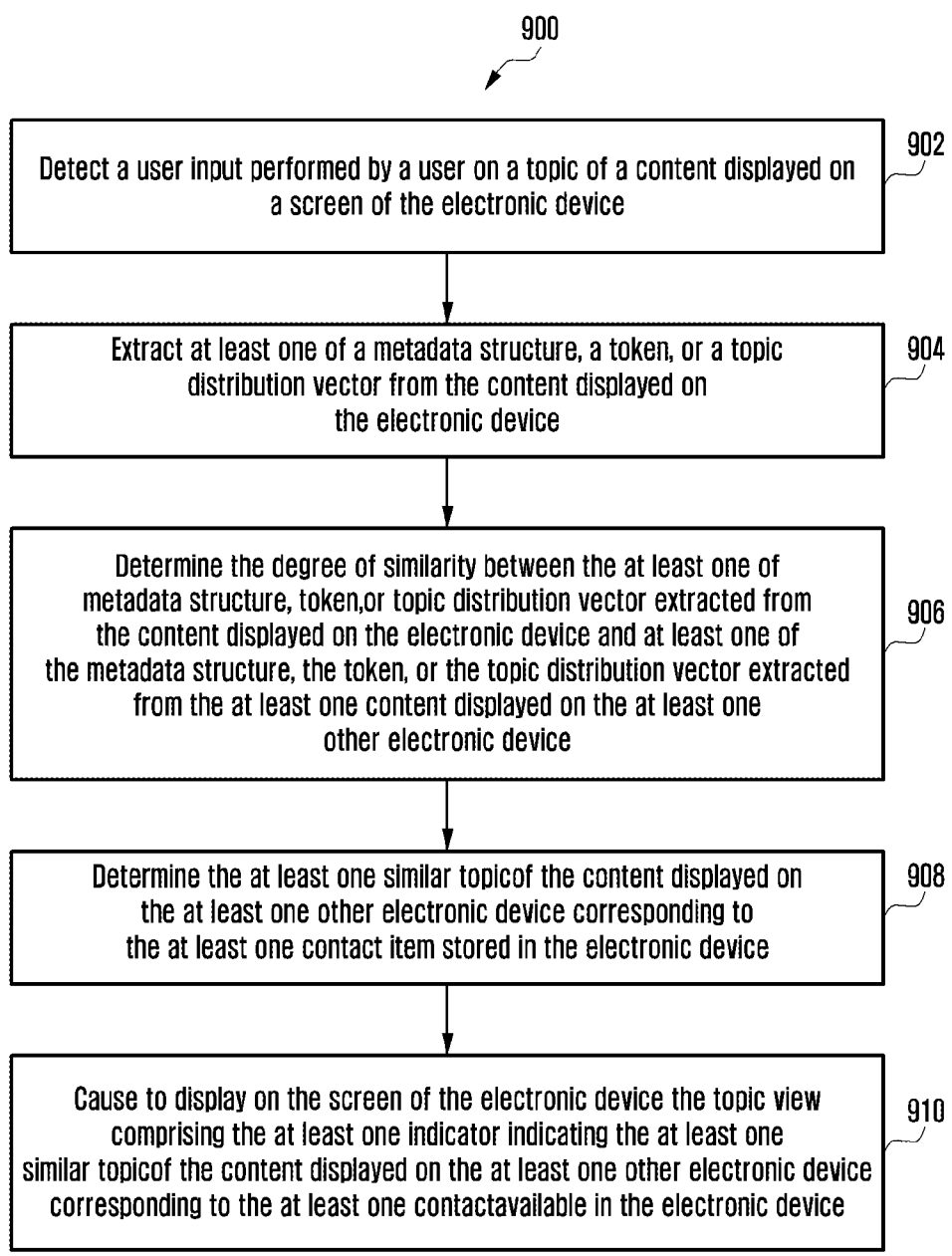

METHOD AND SYSTEM FOR PROVIDING TOPIC VIEW IN ELECTRONIC DEVICE

CROSS-REFERENCE TO RELATED APPLICATION(S)

This application claims priority from an Indian Provisional patent application filed on Jan. 21, 2016, in the Indian Patent Office and assigned Serial number 201641002313 and under 35 U.S.C. § 119(a) of an Indian Non-Provisional patent application filed on Sep. 14, 2016, in the Indian Patent Office and assigned Serial number 201641002313, the entire disclosure of each of which is hereby incorporated by reference.

TECHNICAL FIELD

The present method relates to electronic devices and more particularly to a method and system for providing a topic view in an electronic device.

BACKGROUND

Internet, particularly the World Wide Web (WWW) is a tremendous source of information for a variety of topics (e.g., sports, science, culture, politics, economics, psychology, law, industry, weather, etc.). Frequently, a user browses one or more pieces of information about an interested topic and the browsed information is stored eventually in the browser history. In conventional systems and methods, techniques have been described for aggregating browser histories into each topic associated with the browsed information and displaying the same as a topic view in the browser history.

Further, techniques have been described for socially augmented browsing of a website in an internet application, where the user wishes to join one or more groups of users with a similar interest (such as football). In response, the internet application may present the user with information about the Internet behavior of the users in the joined group, such as information about web site pages that the users in the joined group have viewed and products that the users in the joined group have purchased; however, the ability to provide a topic group (i.e., topic view) instantly by analyzing the information browsed by the users is limited in its ability to provide useful and actionable information.

Deriving a plurality of topics from the content is a key feature of a network entity. Conventionally, a semantic tagging method that outputs semantically linked tags for text content has been described. Methods according to this conventional aspect include inputting the text content, extracting nouns and noun phrases from the text content, detecting tokens (words) from the detected sentences, labeling the tokens, and extracting consecutive noun tokens and noting their frequency of use, mapping the extracted nouns and noun phrases to terms of an ontology, mapping the extracted nouns and noun phrases to a correct sense of the ontology terms using lexical chaining Word Sense Disambiguation (WSD) algorithms, weighting the significance of the concepts of the extracted nouns and noun phrases from their ontological and statistical features, extracting key-phrases from the weighted concepts, and outputting the key-phrases as semantic tags are well known methods. However, the ability to analyze the text and extract the top token with a section by section index of word frequency; meta data considering location, time range, validity, sentiment, category, and publication domain/house; and a topic distribution vector has limits in providing accurate information about topics browsed by the users.

The limitations discussed above provide the motivation for an improved topic view provision method and system.

SUMMARY

Aspects of the present disclosure are to address at least the above-mentioned problems and/or disadvantages and to provide at least the advantages described below. Accordingly, an aspect of the present disclosure is to provide a method and system for providing a topic view in an electronic device.

Another object of the embodiments herein is to provide a method for detecting, by a gesture detection unit, a user input performed by a user on a topic displayed on a screen of the electronic device.

Another object of the embodiments herein is to provide a method for determining, by a controller unit, a degree of similarity between the topic displayed on the electronic device and at least one topic browsed by at least one contact item available in the electronic device.

Another object of the embodiments herein is to provide a method for causing, by the controller unit, display of a topic view on the screen of the electronic device based on the degree of similarity, wherein the topic view comprises at least one topic indicator indicating the at least one topic browsed by the at least one contact item.

Another object of the embodiments herein is to allow an intuitive user experience for invoking a topic view wherein, the topic view of contacts is invoked through a pinch action.

Another object of the embodiments herein is generating a dynamic topic view, wherein there is allowance for creating a new topic view from a user's contact based on match criterion.

Another object of the embodiments herein is to allow joining an existing topic view from one or more users corresponding to contacts stored in the electronic device.

Another object of the embodiments herein is to allow maintaining the topic view only within the user's device wherein only the topic view formed is inside one user device in "self-only" mode.

Embodiments herein provide a method and system for providing a topic view in an electronic device. The method includes detecting the user input on content displayed on a display of the electronic device. The method includes identifying a topic of the content displayed on the electronic device. The method includes determining a degree of similarity between the identified topic and at least one topic related to at least one content displayed on at least one external electronic device corresponding to at least one contact item stored in the electronic device. Further, displaying the topic view on the display of the electronic device based on the degree of similarity. Also, the topic view is displayed with a indicator indicating the at least one contact item corresponding to at least one topic included in the topic view.

In an embodiment, determining the degree of similarity between identified the topic and the at least one topic related to at least one content displayed on at least one external electronic device corresponding to at least one contact item stored in the electronic device includes extracting at least one of a metadata structure, a token, or a topic distribution vector from the content displayed on the electronic device. Further, the method includes determining the degree of similarity between the at least one of metadata structure, token, or topic distribution vector extracted from the content displayed on the electronic device and at least one of a metadata structure, a token, or a topic distribution vector extracted from the at least one content displayed on the at least one external electronic device corresponding to the at least one contact item stored in the electronic device.

In an embodiment, at least one topic indicator in the topic view comprises at least one of an image of corresponding to the at least one content displayed on the at least one external electronic device or an image corresponding to the at least one contact item stored in the electronic device.

In an embodiment, the content is at least one of a text, an image, a Uniform Resource Locator (URL), a Uniform Resource Identifier (URI), and content behind the URL.

In an embodiment, the method includes determining whether the topic view is marked one of dynamic or static. Further, the method includes dynamically updating the topic view if the topic view is marked as dynamic, and retaining the topic view in the electronic device if the topic view is marked as static.

In an embodiment, the method includes transmitting at least one of the topic view or information regarding whether the topic view is marked one of dynamic or static to a server.

In an embodiment, the method includes transmitting information regarding the content displayed on the electronic device to a server. Further the method includes receiving, from the server, at least one of a metadata structure, a token, or a topic distribution vector extracted from the content displayed on the electronic device and at least one of a metadata structure, a token, or a topic distribution vector extracted from the at least one content displayed on the at least one external electronic device corresponding to the at least one contact item stored in the electronic device. Further, the method includes determining the degree of similarity between the at least one of metadata structure, token, or topic distribution vector extracted from the content displayed on the electronic device and the at least one of metadata structure, token, or topic distribution vector extracted from the at least one content displayed on the at least one external electronic device corresponding to the at least one contact item stored in the electronic device.

In an embodiment, the method includes determining whether the identified topic is a shareable topic. Further, the method includes transmitting information regarding the content displayed on the electronic device to at least one of a server or the at least one external electronic device when the identified topic is the shareable topic In an embodiment, the method includes receiving a selection of any one of the at least one indicator of the topic view. Further, the method includes determining a main topic of the topic view based on the selection In an embodiment, the method includes determining a degree of similarity between the main topic of the topic view and the at least one topic related to the at least one content displayed on the at least one external electronic device corresponding to the at least one contact item stored in the electronic device. Further, the method includes changing the indicator included in the topic view based on the degree of similarity between the main topic of the topic view and the at least one topic related to the at least one content displayed on the at least one external electronic device corresponding to the at least one contact item stored in the electronic device.

In an embodiment, the method includes receiving a selection of the at least one indicator of the topic view. Further, the method includes retaining, based on the selection, the at least one indicator of the topic view when the topic view is updated.

Embodiments herein provide an electronic device to provide a topic view. The electronic device includes a gesture detection unit configured to detect a user input on content displayed on a display of the electronic device. The electronic device includes a controller configured to identify a topic of the content displayed on the electronic device, determine a degree of similarity between the identified topic and at least one topic related to at least one content displayed on at least one external electronic device corresponding to at least one contact item stored in the electronic device. The electronic device includes the controller configured to display a topic view on the display of the electronic device based on the degree of similarity, wherein the topic view module comprises at least one indicator indicating the at least one contact item corresponding to at least one topic included in the topic view.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The above and other aspects. features, and advantages of certain embodiments of the present disclosure will be more apparent from the following description taken in conjunction with the accompanying drawings, in which:

FIG. 5 illustrates a sequence diagram for providing the topic view without a server, according to an embodiment of the present disclosure;

FIG. 9 is another flow diagram illustrating a method for providing a topic view on an electronic device, according to an embodiment of the present disclosure.

DETAILED DESCRIPTION

Figure 1:
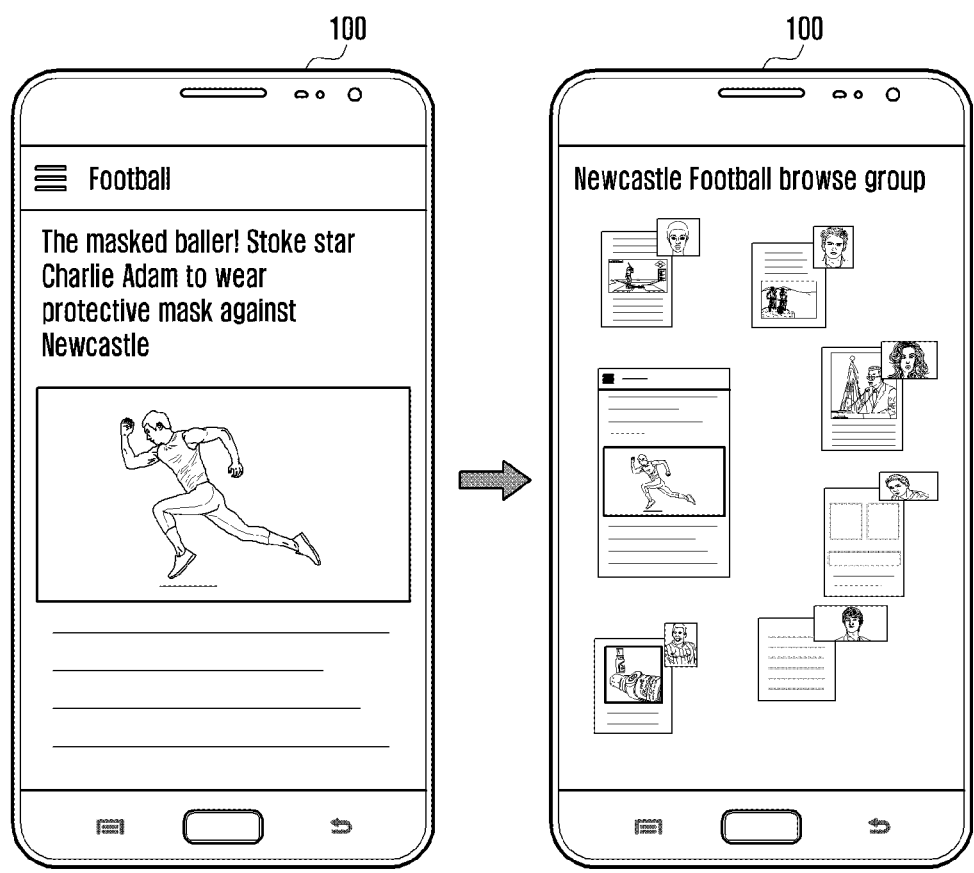
FIG. 1 illustrates an example in which a pinch action is performed to display a topic view on a screen of an electronic device, according to an embodiment of the present disclosure.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Throughout the specification herein "content" may be any type of electronic media that is viewable via a communication device such as a computer, laptop, PDA, Blackberry™, cell phone, or the like.

With reference to the drawings, and more particularly to FIGS. 1 through 10, where similar reference characters denote corresponding features consistently throughout the figures, there are shown preferred embodiments.

FIG. 1 illustrates an example in which a pinch action is performed by a user to display a topic view on a screen of an electronic device 100, according to an embodiment of the present disclosure. The electronic device 100 can be, for example and not limited to, a laptop, a desktop computer, a mobile phone, a smart phone, Personal Digital Assistants (PDAs), a tablet, a phablet, a consumer electronic device, or any other electronic device.

In an embodiment, the electronic device 100 may detect an input (i.e., pinch gesture) performed by the user on the content displayed on the screen of electronic device 100, invoking the topic view to be provided. Further, the electronic device 100 may render the topic view according to the topic of the content displayed on the screen of the electronic device 100 when the electronic device 100 detects the pinch gesture. In an embodiment, the thumbnail images of the content browsed by the users corresponding to the contacts stored in the electronic device 100 similar to the topic browsed by the user of the electronic device 100 may be displayed. The topic view title is displayed along with the thumbnail images of contacts, where the title is provided with an editable text box for the convenience of the user.

Figure 2:
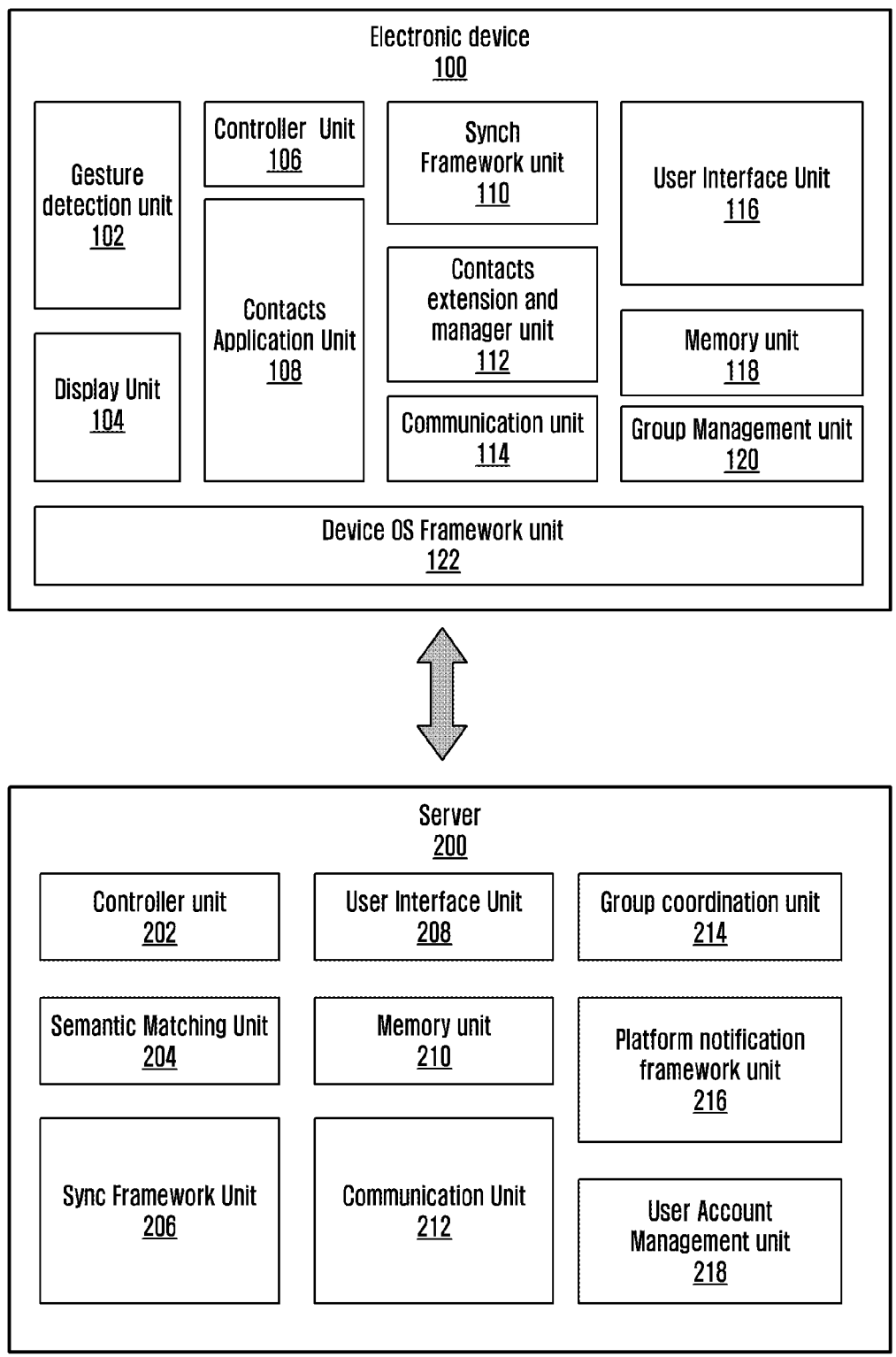
FIG. 2 illustrates a client-server architecture for providing a topic view, according to an embodiment of the present disclosure.

FIG. 2 illustrates client-server architecture for providing the topic view, according to an embodiment of the present disclosure. In an embodiment, the client-server architecture may include at least one of the electronic device 100 or a server 200. The electronic device 100 may include a gesture detection unit 102, a display unit 104, a controller unit 106, a contacts application unit 108, a synch framework unit 110, a contacts extension & manager unit 112, a communication unit 114, a user interface unit 116, a memory unit 118, a group management unit 120, and a device OS framework unit 122.

The gesture detection unit 102 (i.e., input device) may include various input circuitry, such as and without limitation, a touch panel. The touch panel may recognize a touch input in a manner of capacitive type, resistive type, infrared type, or ultrasonic type. Also, the touch panel may further include a control circuit. The gesture detection unit 102 can be configured to receive the pinch gesture on the content displayed on the display unit 104 (i.e., screen) of the electronic device 100. In an embodiment, the content can be, for example, emails, documents, e-books, browsing history, web page(s), or the like. Further, the controller unit 106 can be configured to compute a semantic signature of the content displayed on the display unit 104. In an embodiment, the signature can be, for example, a list of at least one of concept codes or concept type codes associated with a metadata of the content. In an embodiment, the semantic signature can be, for example, a signature associated with the content displayed on the electronic device 100.

Further, the controller unit 106 can be configured to determine a degree of similarity between the semantic signature of the content displayed on the display unit 104 and a contact signature present in the electronic device 100. In an embodiment, the contact signature can be, for example, a signature associated with a content displayed on other electronic devices corresponding to the at least one contact included in the contact list on the electronic device 100. In an embodiment, the semantic signature is generated within the electronic device 100 in a "client only mode" without requiring the server 200.

Further, in a "client-server mode", the content is transmitted to the server 200 through the communication unit 114 for determining the degree of similarity.

Further, the contact application unit 108 can be configured to compare the contact signatures with the semantic signatures and match the contact signatures with the corresponding semantic signatures.

Further, the controller unit 106 can be configured to extract the semantic signature from the content displayed on the electronic devices.

The synch framework unit 110 can be configured to gather contacts of friends of friends using social media (i.e., social contacts) and the information regarding the topic of content browsed by the users corresponding to the contacts.

Further, the contacts extension and manager unit 112 can be configured to extend the contact list by synchronizing the social contacts and may have an interface for searching and maintaining the information regarding the contacts.

Further, the controller unit 106 can be configured to display the topic view on the display unit 104 of the electronic device 100.

Further, the communication unit 114 can be configured for communicating internally between the units and externally with the networks. The communication unit 114 can be configured to send or receive data from at least one of the server 200 or at least one other electronic device. In an embodiment, the communication unit 114 may include at least one of a transmitter or a receiver.

Further, the user interface unit 116 can be configured to have an interface for interacting with the user of the electronic device 100 and provide the options for the user to mark the topic view as "dynamic" or "static" and to exit or delete the topic view.

Further, the memory unit 118 can be configured to store the topic view and the information regarding the contacts in the electronic device 100.

Further, the memory unit 118 may include one or more computer-readable storage media. The memory unit 118 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory unit 118 may, in some examples, be considered a non-transitory storage medium. The term "non-transitory" may indicate that the storage medium is not embodied in a carrier wave or a propagated signal. However, the term "non-transitory" should not be interpreted as meaning that the memory unit 118 is non-movable. In some examples, the memory unit 118 can be configured to store larger amounts of information than the memory. In certain examples, a non-transitory storage medium may store data that can, over time, change (e.g., in Random Access Memory (RAM) or cache).

Further, the group management unit 120 can be configured to manage the stored topic view by dynamically updating the topic view when the topic view is marked as dynamic (i.e., dynamic topic view), and retaining the topic view in the electronic device 100 when the topic view is marked as static (i.e., static topic view).

Further, the device OS framework unit 122 can be configured to control the overall operation of the electronic device 100.

The server 200 according to the FIG. 2 includes a controller unit 202, a semantic matching unit 204, a sync framework unit 206, a user interface unit 208, a memory unit 210, a communication unit 212, a group coordination unit 214, a platform notification framework unit 216 and a user account management unit 218.

In an embodiment, the controller unit 202 can be configured to extract the semantic signature for the content received through the communication unit 114 from the electronic device 100.

Further, the semantic matching unit 204 can be configured to compare the generated semantic signatures with the contact signatures after receiving from the electronic device 100 information regarding the contacts through the sync framework unit 206.

Further, the user interface unit 208 can be configured to interact with the extraction software available in the server 200.

Further, the memory unit 210 can be configured to store the content browsed by each user and store the semantic signatures computed periodically by the controller unit 202. Further, the memory unit 210 can be configured to store contacts and the topic view received from the sync framework unit 206.

The communication unit 212 can be configured to send and receive the data from the electronic device 100.

Further, the group coordination unit 214 can be configured to search and update the data between the server 200 and the electronic device 100 relating to the each topic view.

The platform notification framework unit 216 sends a notification to the electronic device 100 if there is an update regarding the new topic browsed by the user corresponding to the contact in the topic view.

Further, the user account management unit 218 can be configured to maintain a user account for each user separately and store the data relating to the user account in the memory unit 210 of the server 200.

The FIG. 2 shows a limited overview of the client-server architecture 200, but it is to be understood that other embodiments are not limited thereto. Further, the client-server architecture 200 can include any number of units along with other hardware or software components communicating with each other. For example, the component can be, but is not limited to, a process running in the controller or processor, an object, an executable process, a thread of execution, a program, or a computer. By way of illustration, both an application running on a device and the device itself can be a component.

Figure 3:
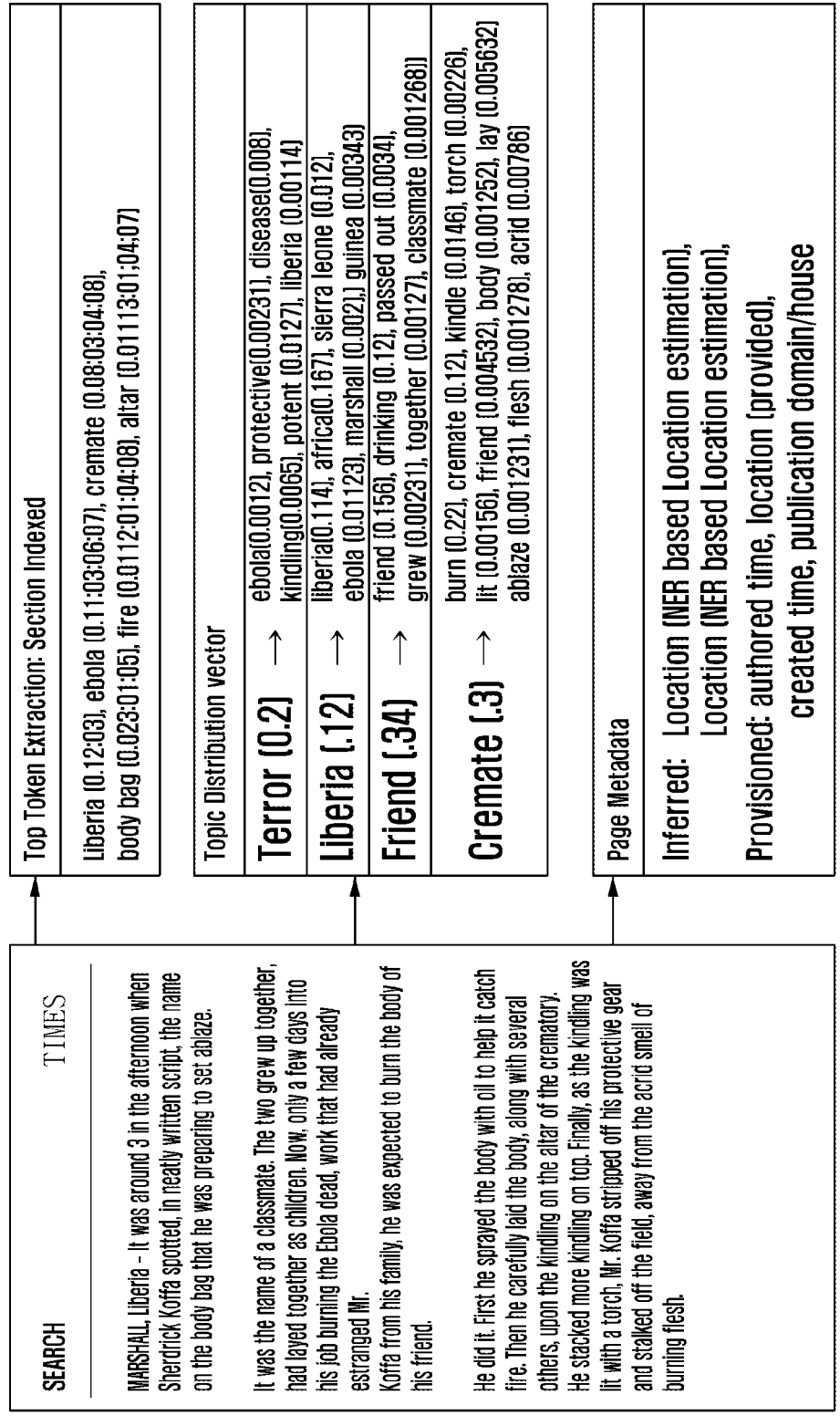
FIG. 3 illustrates a method for extracting a topic, according to an embodiment of the present disclosure.

FIG. 3 illustrates a method for extracting the topic, according to an embodiment of the present disclosure.

In an embodiment, three structures are necessary for providing the best match between the content and the topic. Further, based on the keyword frequency in the received the content, a token is extracted. The token extraction is based on a section index for better accuracy of the topic extraction. Each paragraph is indexed based on the keyword frequency or inverse paragraph frequency matched with the paragraph location index stored in a local database (not shown).

Further, a metadata structure including provisioned and inferred metadata is extracted from the received content. In an embodiment, the inferred metadata is extracted by considering Location (Named-entity recognition (NER) based Location estimation), time range, validity, sentiment, and category. In an embodiment, the provisioned metadata is extracted by considering authored time, created time, location (provided), and publication domain of the content.

Further, the topic distribution vector is extracted based on a conventional unsupervised extraction technique.

The topic structure is used for the topic based matching between the content and the significant keywords, which are used for ordering based on relevance. The metadata structure is used for ordering based on a temporal and meta-associations. Further, a Match metric is formed by a joint function of a Token match, a topic match, and a metadata match. Further, each match process has its own characteristics that determine best affinity levels. Further, each match maybe weighted so that certain types are given more weighting (e.g., metadata match). The metadata match is one of the most critical parts (as found through Experiments) and most important things in the metadata match are machine learnt (i.e., inferred) metadata fields. More weighting is provided to the inferred metadata than the provisioned (i.e., explicitly provided within the content) metadata. Once metadata fields are inferred, the system figures a meta field that gives maximum information gain and gives that weighting with respect to a normalized weight factor calculated for all significant fields within a value between 0-1. Relevance is calculated by the below Equation-1:

$$(P(a)\log(P(a)-P(b)\log(P(b))) \quad \text{Equation-1}$$

where p(x) is the probability of the meta fields.

The most significance of the inferred meta fields is provided adapted weighting when computing affinity as described in conjunction with FIG. 3. Topic match is an unsupervised extraction with theoretically unlimited topics and has been developed for this framework. This gives finer control of the topics that are specific to a web page being analyzed. The hyper-parameters are also added to the metadata structure so that, if required, the same hyper-parameters can be used for checking/matching pages at other user devices.

Figure 4:
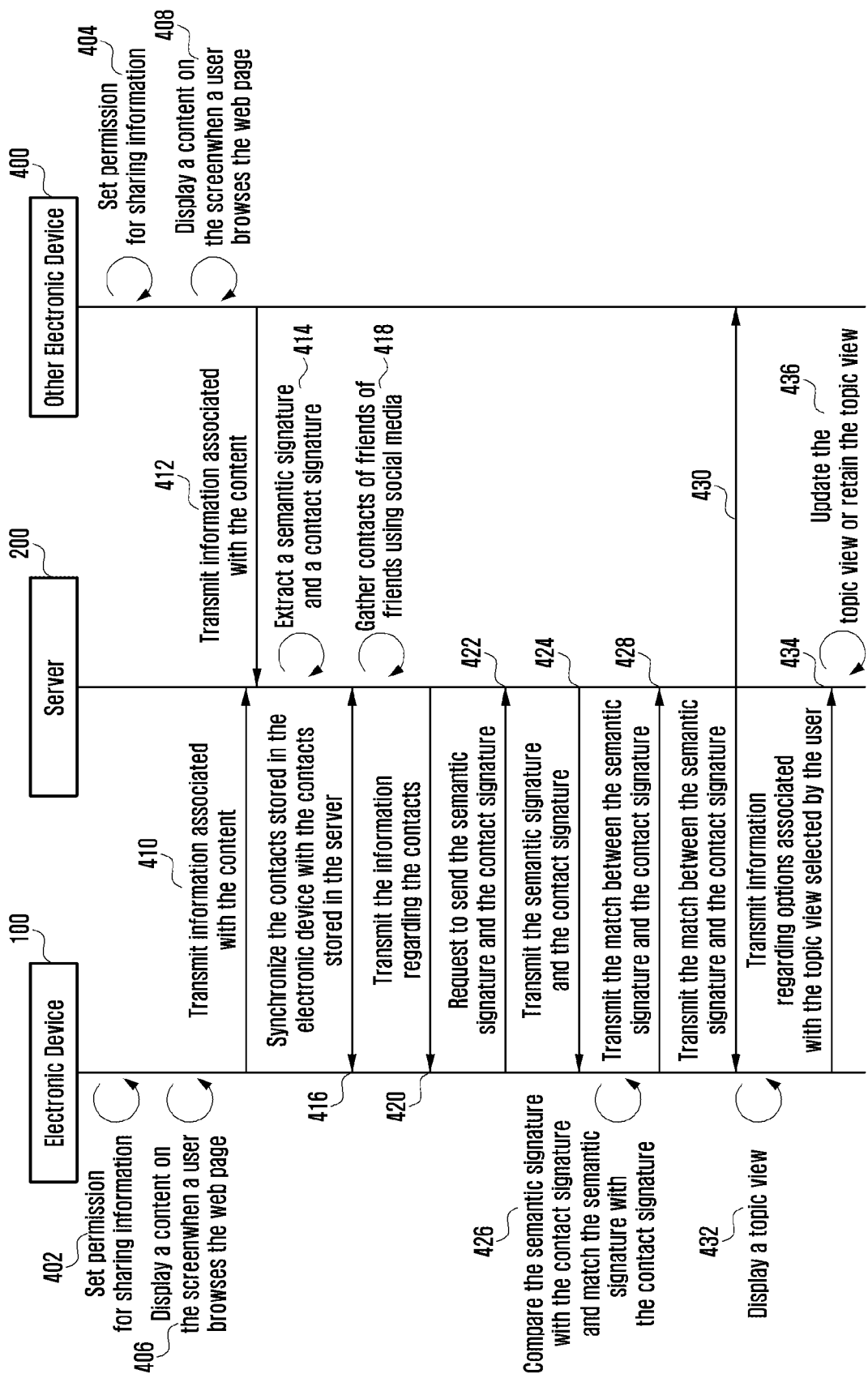
FIG. 4 illustrates a sequence diagram for providing a topic view with a server, according to an embodiment of the present disclosure.

FIG. 4 illustrates a sequence diagram for providing the topic view with the server 200, according to an embodiment of the present disclosure.

At step 402, the user grants the permission in the electronic device 100 for sharing information associated with the content displayed on a screen of the electronic device 100 with the server 200 or at least one other electronic device 400 corresponding to at least one contact item stored in the electronic device 100. In an embodiment, the information associated with the content may include, for example, a Uniform Resource Locator (URL) about the content. At step 404, permission for sharing information, associated with the content displayed on a screen of the at least one other electronic device 400, with the electronic device 100 or server 200 is set in the at least one other electronic device 400.

At step 406, the electronic device 100 displays the content on the screen of the electronic device 100 when the user browses the web page of interest using the electronic device 100. At step 408, the at least one other electronic device 400 displays the content on the screen of the at least one other electronic device 400.

At step 410, in an embodiment, the electronic device 100 transmits the information associated with the content browsed by the user to the server 200 periodically. In another embodiment, the information associated with the content browsed by the user is sent to the server 200 upon request by the user. In an embodiment, the information associated with the content is sent through a scheduler (not shown) to the server 200 during the non-usage of the electronic device 100. In an example, if the user browses a plurality of web pages in a day, the information associated with the browsed web pages are sent to the server 200 through the scheduler during night hours when the electronic device 100 is not in use by the user. At step 412, in an embodiment, the at least one other electronic device 400 transmits the information associated with the content to the server 200.

At step 414, the server 200 extracts the semantic signature and contact signature from the received information associated with the contents after analyzing the received information associated with the contents.

At step 416, the contacts stored in the electronic device 100 are synchronized with the contacts stored in the server 200.

At step 418, the server 200 obtains the social contacts through the Internet from user accounts of the social media.

At step 420, the server 200 transmits the information regarding the contacts to the electronic device 100. In an embodiment, contacts are updated in the electronic device 100 when the electronic device 100 receives the information regarding the contacts from the server 200.

At step 422, the electronic device 100 requests to send the semantic signature and the contact signature to the server 200.

At step 424, the server 200 transmits the semantic signature and the contact signature to the electronic device 100.

At step 426, the electronic device 100 compares the semantic signature with the contact signature and matches the semantic signature with the contact signature available in the electronic device 100. In an example, the server 200 can be configured to match the semantic signature with the contact signature.

At the step 428, the electronic device 100 transmits the match between the semantic signature and the contact signature to the server 200. In an embodiment, the electronic device 100 may transmit the topic view to the server 200.

At step 430, the server 200 transmits the match between the semantic signature and the contact signature to at least one of the electronic device 100 or the at least one other electronic device 400.

At step 432, the topic view is displayed in the electronic device 100 with a matched topic and thumbnail image of at least one contact. In an embodiment, the electronic device 100 may provide the options for the user to store the topic view in at least one of the electronic device 100 or the server 200. In an embodiment, the electronic device 100 may provide the options for the user to mark the topic view as either dynamic or static.

At the step 434, the electronic device 100 transmits the information regarding the options selected by the user to the server 200.

At step 436, the server 200 can be configured to dynamically update the topic view if the option regarding the topic view is selected as dynamic by the user. In an embodiment, the server 200 can be configured to retain the topic view if the option regarding the topic view is selected as static by the user.

FIG. 5 illustrates a sequence diagram for providing the topic view without the server 200, according to an embodiment of the present disclosure.

At step 502, the permission for sharing information, associated with the content displayed on a screen of the electronic device 100, with the at least one other electronic device 500 corresponding to at least one contact item stored in the electronic device 100 is set in the electronic device 100 by the user. In an embodiment, the information associated with the content may include, for example, the URL about the content. At step 504, permission for sharing information, associated with the content displayed on a screen of the at least one other electronic device 500, with the electronic device 100 is set in the at least one other electronic device 500.

At step 506, the electronic device 100 displays the content on the screen of the electronic device 100 when the user browses the web page of interest using the electronic device 100. At step 508, the at least one other electronic device 500 displays the content on the screen of the at least one other electronic device 500.

At step 510, the electronic device 100 extracts the semantic signature from the content displayed on the screen of the electronic device 100. At step 512, the at least one other electronic device 500 extracts the contact signature from the content displayed on the screen of at least one other electronic device 500.

At step 514, the semantic signatures are sent to the at least one other electronic device 500 associated with the permission.

At step 516, the electronic device 100 receives the contact signatures from the at least one other electronic device 500 associated with the permission.

At step 518, the electronic device 100 compares the semantic signatures with the contact signatures and matches the semantic signatures with the received contact signatures.

At step 520, the electronic device 100 transmits the match between the semantic signatures and the contact signatures to the at least one other electronic device 500.

At step 522, the topic view is displayed in the electronic device 100 with the matched topic of the content and the thumbnail image of the at least one contact stored in the electronic device 100. In an embodiment, the electronic device 100 provides the options for the user to store the topic view in the electronic device 100 and to mark the topic view as either dynamic or static.

At step 524, the topic view management is performed in the electronic device 100. In an embodiment, the electronic device 100 may determine whether the topic view is marked one of dynamic or static and manage the topic view by dynamically updating the topic view if the topic view is marked as dynamic, and retaining the topic view if the topic view is marked as static.

Figure 6A:
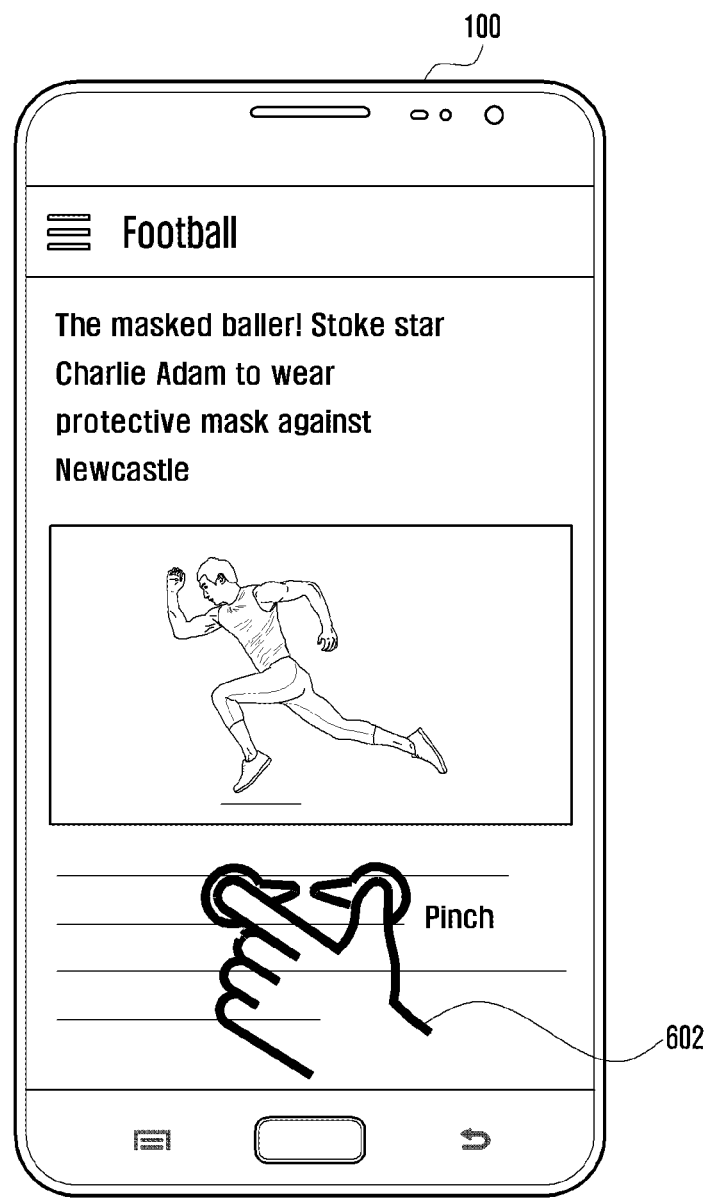
FIG. 6a illustrates a pinch action performed by the user on the content performed by a user on a topic displayed on a screen of the electronic device for invoking the topic view, according to an embodiment of the present disclosure.

FIG. 6a illustrates a pinch action performed by the user on the content performed by a user on the topic displayed on the screen of the electronic device 100 for invoking the topic view, according to an embodiment of the present disclosure. In an embodiment, as shown in the FIG. 6a, the pinch gesture 602 is performed by the user on the content displayed on the display unit 104 of the electronic device 100. After the pinch gesture 602 is detected by the gesture detection unit 102, the gesture detection unit 102 sends the request to the controller unit 106 to provide the topic view.

Figure 6B:
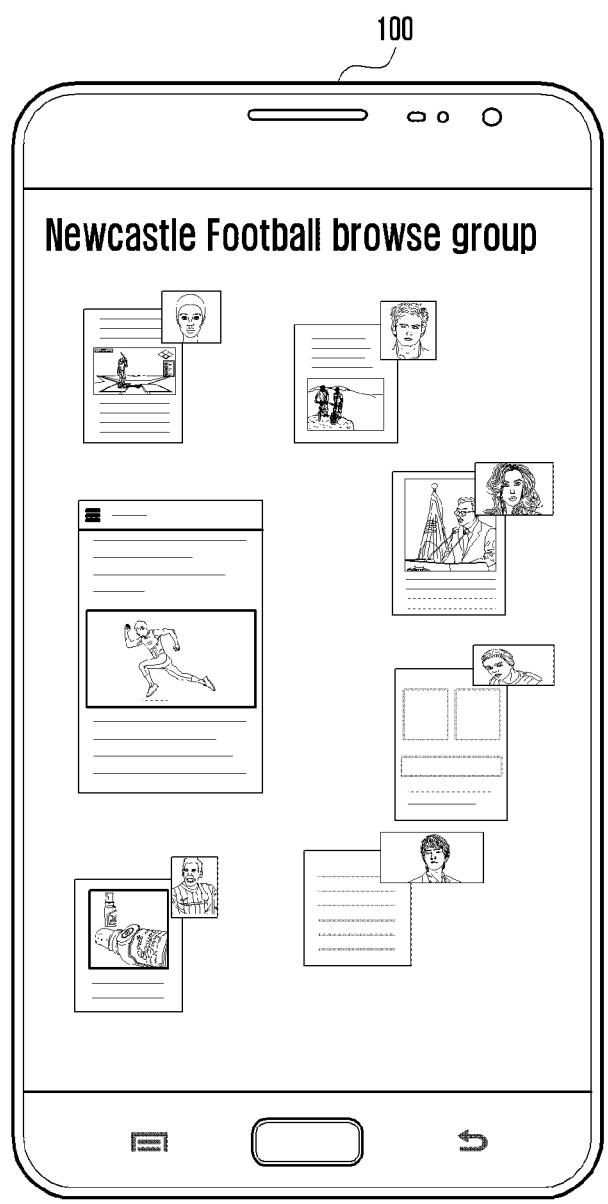
FIG. 6b illustrates a topic indicator along with a thumbnail image corresponding to the topic and an image of the contact, according to an embodiment of the present disclosure.

FIG. 6b illustrates a topic indicator along with a thumbnail image corresponding to the topic and an image of the contact, according to an embodiment of the present disclosure. In an embodiment, the topic view is provided on the display unit 104 of the electronic device 100. The topic view displays the similar page browsed by the users of the at least one other electronic device corresponding to the contacts with respect to the page browsed by the user of the electronic device 100. In an example, the user of the electronic device 100 can use either a menu option or "pinch to shrink action" for provoking display of the topic view. The topic view is displayed with the thumbnail image of the content browsed by the users corresponding to the contacts similar to the topic browsed by the user of the electronic device 100. Further, the thumbnail image of the contact is displayed along with the thumbnail image of the content as shown in the FIG. 6b. Further, the thumbnail images may be displayed around the content browsed by the user of the electronic device 100 as shown in FIG. 6b. Further, the suggested title of the topic view can be changed or modified according to the user interest.

Figure 6C:
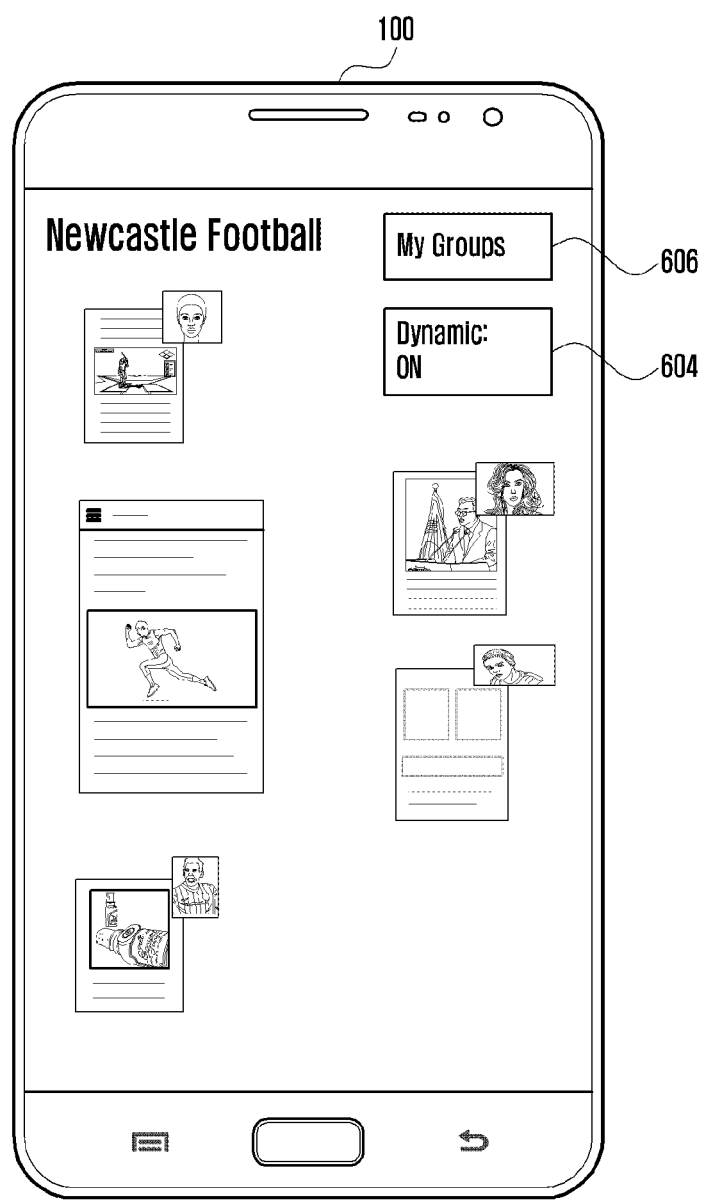
FIG. 6c illustrates a topic view property of dynamic ON and group view, according to an embodiment of the present disclosure.

FIG. 6c illustrates the topic view property of dynamic ON and groups view, according to an embodiment of the present disclosure. In an embodiment, the user is provided with the options to change the characteristics of the topic view such as dynamic or static. The "dynamic ON" option 604 is configured to dynamically update the topic view as the users corresponding to the contacts of the topic view browse similar topics matching the topic view. The update also provides the thumbnail images of the content browsed by the users corresponding to the contact regarding the similar topic. Further, a list of the existing topic views can be viewed by the user upon selecting "My Groups" option 606.

Figure 6D:
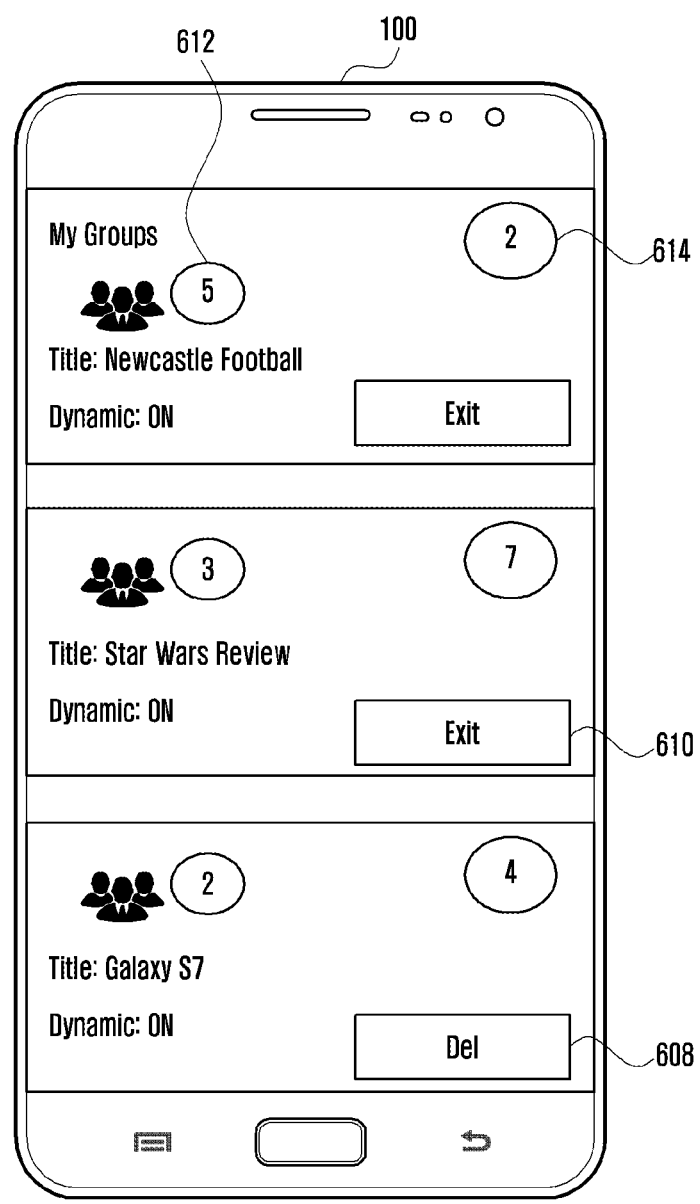
FIG. 6d illustrates a list including at least one existing topic view associated with the electronic device, according to an embodiment of the present disclosure.

FIG. 6d illustrates a list of the existing topic views associated with an electronic device, according to an embodiment of the present disclosure. In an embodiment, the electronic device 100 may display the list of the existing topic views associated with the electronic device 100 on the display of the electronic device 100 when the user of the electronic device 100 selects the "My Groups" option. In an embodiment, the a list of the existing topic views may have the option "del" 608 to delete the topic view if it is created by the user and the option "exit" 610 to withdraw from the topic view if the user is part of the topic view. Further, the "My Groups" option may provide the information about the number of users 612 in the particular topic view. Further, the topic view may provide the information about the number of new content 614 browsed by the users of the at least one other electronic device corresponding to the contacts related to the particular topic view.

Figure 7A:
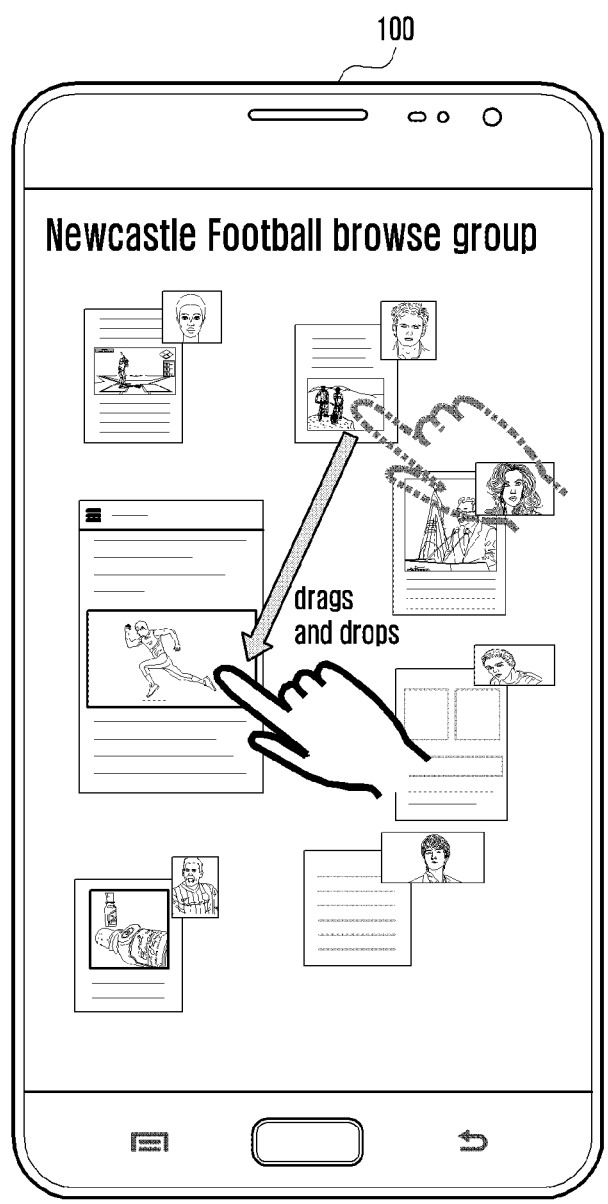
FIG. 7a illustrates a drag and drop action for changing a topic view definition, according to an embodiment of the present disclosure.

FIG. 7a illustrates a drag and drop action for changing the topic view definition, according to an embodiment of the present disclosure. In an embodiment, the electronic device 100 can be configured to detect the drag and drop gesture 702 for provoking change of the topic view definition (i.e., main topic of the topic view). Further, the user can drag and drop the web page (i.e., thumbnail image of the content) from the section associated with the contacts of topic view to the another section (i.e., main central page) so that it becomes the new anchor page and the topic view definition changes in accordance with the new anchor page. Further, the topic view definition is based on the anchor page, and it changes the topic view definition and some pages (i.e., thumbnail image of the content) may be replaced. The pages that are unlocked may only be changed if there is a significant difference between the anchor page and the web page associated with the contacts. Further, the thumbnail images of the contents may change if web pages are found by the system based on the new topic view definition.

Figure 7B:
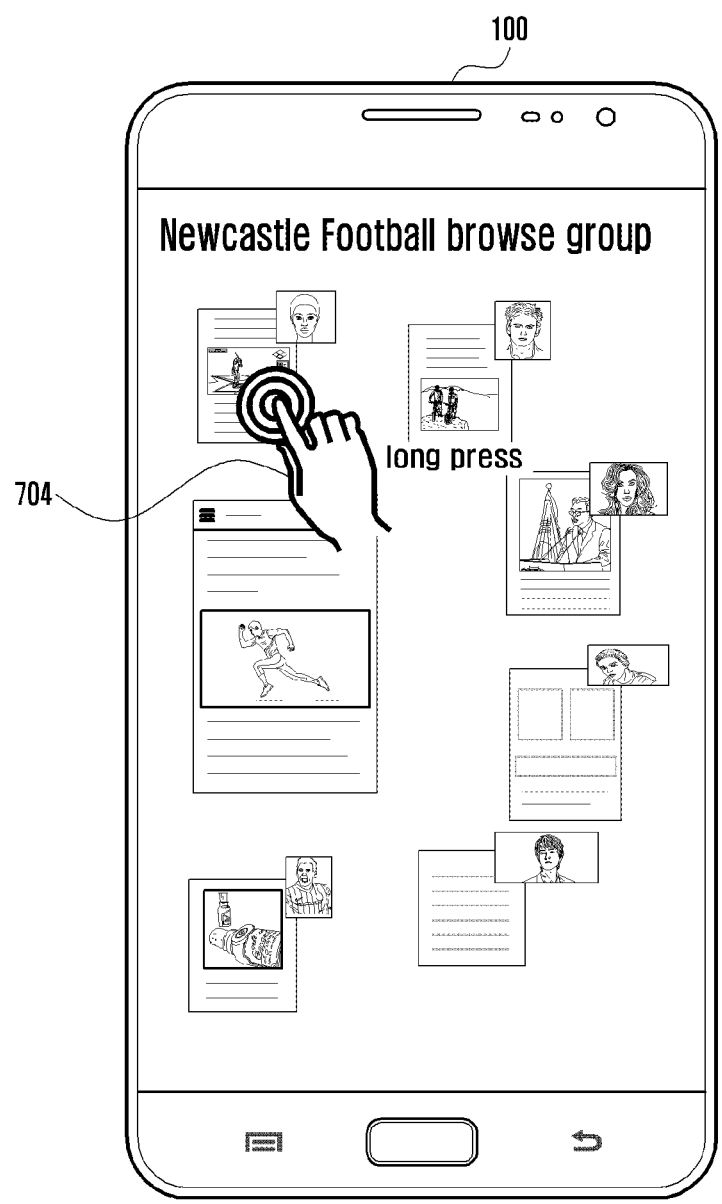
FIG. 7b illustrates a long press action for locking a particular content associated with a contact, according to an embodiment of the present disclosure.

FIG. 7b illustrates a long press action for locking the particular content associated with the contact, according to an embodiment of the present disclosure. In an embodiment, the electronic device 100 can be configured to detect the long press gesture 704 for provoking lock of the web page (i.e., thumbnail image of the content) within the topic view. Further, if the user finds that particular content of the particular contact seems to be very relevant to the topic view definition, then the user may lock that thumbnail image by performing the long press gesture 704 on the thumbnail image as shown in the FIG. 7b. Further, when the electronic device 100 detects the long press gesture 704 on the web page, the electronic device 100 may bring up a menu to lock the web page within the topic view (i.e., social bookmark). Further, if the lock is "ON" and even if the topic view is dynamic, the locked web page is preserved without any changes being made to the content. Further, if other pages are unlocked in the dynamic topic view, then the content may change within the topic view. However, the locked web page is still visible in the dynamic topic view. Further, if the topic view includes more than one page associated with the at least one user within the group, then all the pages are visible as multiple pages superimposed over each other (i.e., book pages).

Figure 8A:
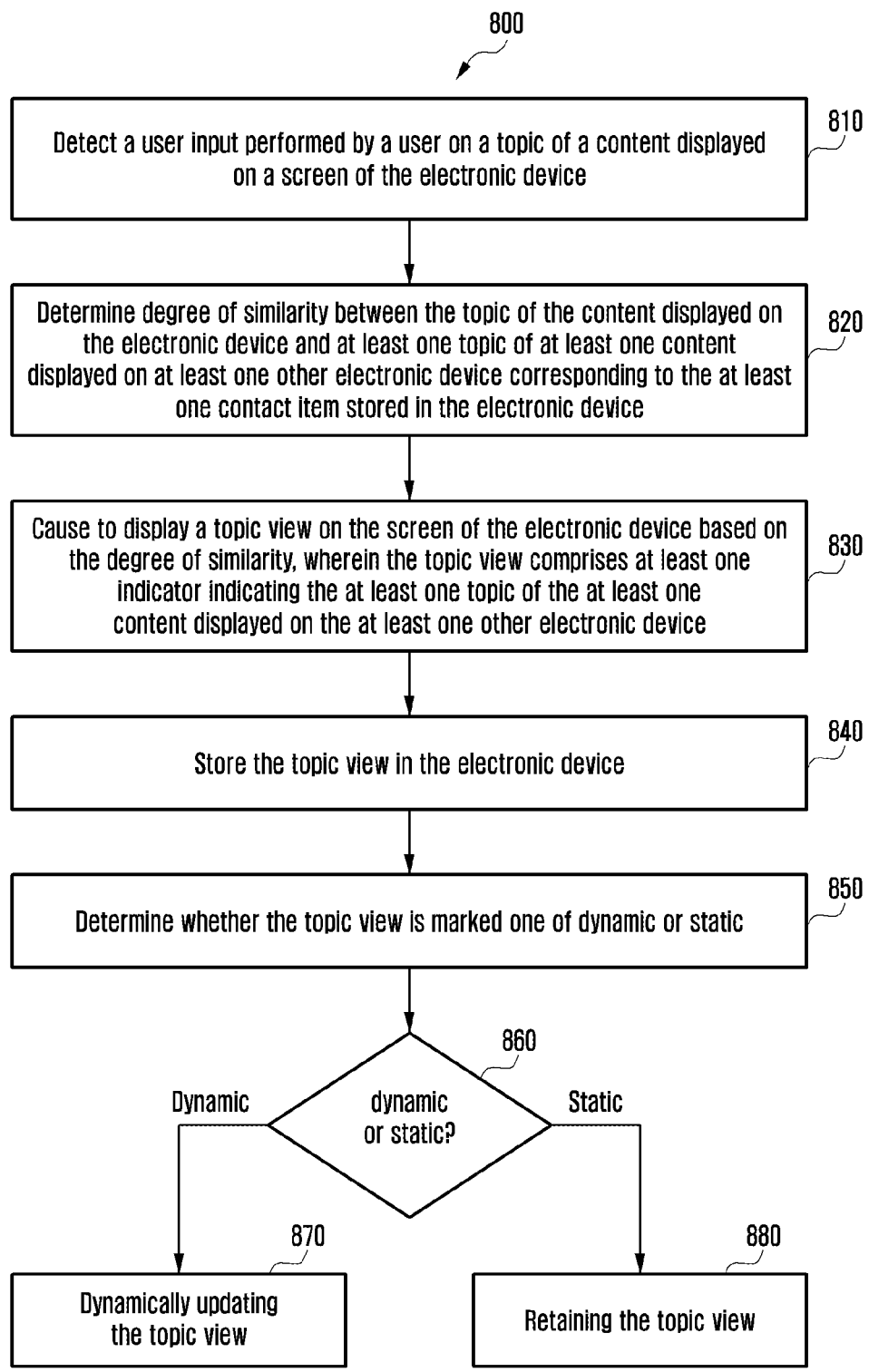
FIG. 8a is a flow diagram illustrating a method for providing a topic view on an electronic device, according to an embodiment of the present disclosure.

FIG. 8a is a flow diagram 800 illustrating a method for providing the topic view on the electronic device 100, according to an embodiment of the present disclosure.

In an embodiment, at step 810, the method 800 includes detecting the input associated with the topic view. In an embodiment, the electronic device 100 may detect, for example, the user input performed by the user on the topic of the content displayed on the display unit 104 of the electronic device 100.

At step 820, the method 800 includes determining the degree of similarity between the topic of the content displayed on the electronic device 100 and the at least one topic of the at least one content displayed on the at least one other electronic device corresponding to the at least one contact available in the electronic device 100. In an embodiment, the electronic device 100 may determine the degree of similarity between the topic of the content displayed on the electronic device 100 and the at least one topic of the content displayed on the at least one other electronic device corresponding to the at least one contact available in the electronic device 100. In another embodiment, the server 200 may determine the degree of similarity between the topic of the content displayed on the electronic device 100 and the at least one topic of the content displayed on the at least one other electronic device corresponding to the at least one contact available in the electronic device 100.

At step 830, the method 800 includes causing to display the topic view on the display unit 104 of the electronic device 100 based on the degree of similarity. In an embodiment, the electronic device 100 may display the topic view on the display unit 104 of the electronic device 100 based on the degree of similarity. In another embodiment, the server 200 may cause display of the topic view on the display unit 104 of the electronic device 100 based on the degree of similarity. In an embodiment, the topic view may include the at least one topic indicator indicating the at least one topic of the content displayed on the at least one other electronic device corresponding to the at least one contact.

At step 840, the method 800 includes storing the topic view in the memory unit 118 of the electronic device 100. In an embodiment, the electronic device 100 may store the topic view in the memory unit 118 of the electronic device 100. In another embodiment, the server 200 may cause storage of the topic view in the memory unit 118 of the electronic device 100.

At step 850, the method 800 includes detecting whether the topic view is marked one of dynamic or static in the electronic device 100. In an embodiment, the method allows the electronic device 100 to detect whether the topic view is marked one of dynamic and static in the electronic device 100. In another embodiment, the method allows the server 200 to detect whether the topic view is marked one of dynamic and static in the electronic device 100.

At step 860, if the topic view is marked as static then, at step 880, the method 800 includes causing retention of the topic view in the electronic device 100. In an embodiment, the electronic device 100 may retain the topic view in the electronic device 100. In another embodiment, the server 200 may cause retention of the topic view in the electronic device 100. At step 860, if the topic view is marked as dynamic then, at step 870, the method includes dynamically updating the topic view in the electronic device 100. In an embodiment, the electronic device 100 may dynamically update the topic view in the electronic device 100. In another embodiment, the server 200 may cause the topic view to be updated dynamically in the electronic device 100. In an embodiment, updating the topic view in the electronic device 100 may comprise searching and synchronizing the topic of the content displayed on the at least one other electronic device corresponding to the contacts in the topic view. Further, updating the content comprises replacing the old content as the thumbnail image of the new content along with the thumbnail image of the contact in the topic view.

The various actions, acts, blocks, steps, or the like in the flow chart 800 may be performed in the order presented, in a different order, or simultaneously. Further, in some embodiments, some of the actions, acts, blocks, steps, or the like may be omitted, added, modified, skipped, or the like without departing from the scope of the disclosure.

Figure 8B:
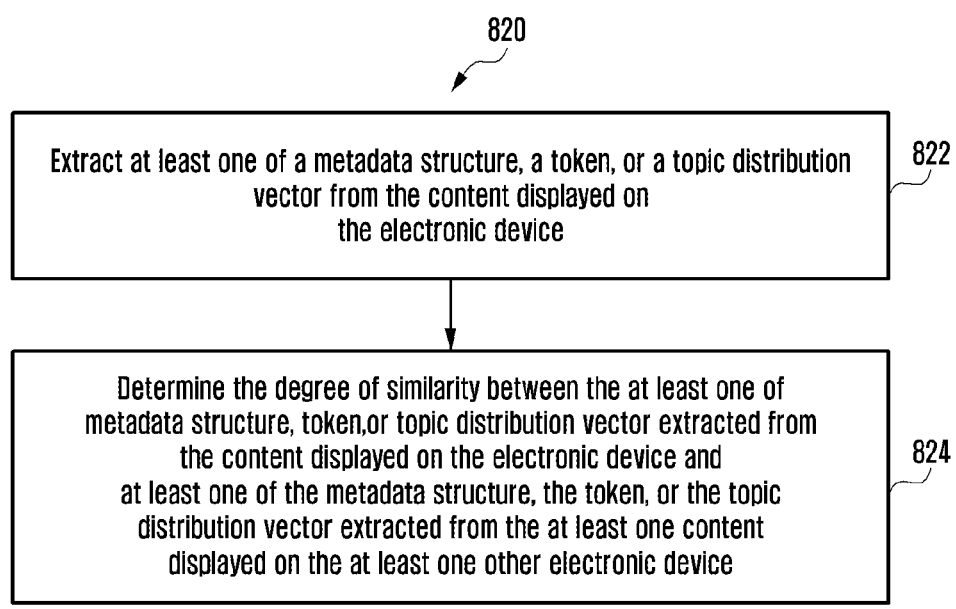
FIG. 8b is a flow diagram illustrating a method for determining a degree of similarity between a topic of a content displayed on an electronic device and at least one topic of the content displayed on the at least one other electronic device corresponding to at least one contact available in the electronic device, according to an embodiment of the present disclosure.

FIG. 8b is a flow diagram 820 illustrating a method for determining the degree of similarity between the topic of the content displayed on the electronic device 100 and the at least one topic of the content displayed on the at least one other electronic device corresponding to the at least one contact available in the electronic device 100, according to an embodiment of the present disclosure.

At step 822, the method 820 includes extracting at least one of a metadata structure, a token, or a topic distribution vector associated with the topic of the content displayed on the electronic device 100 for computing the semantic signature.

Further, at step 824, the method 820 includes determining the degree of similarity by comparing the at least one of metadata structure, token, or topic distribution vector associated with the topic of the content displayed on the electronic device 100 with at least one of the metadata structure, the token, or the topic distribution vector associated with the at least one topic of the content displayed on the at least one other electronic device corresponding to the at least one contact.

The various actions, acts, blocks, steps, or the like in the flow chart 820 may be performed in the order presented, in a different order, or simultaneously. Further, in some embodiments, some of the actions, acts, blocks, steps, or the like may be omitted, added, modified, skipped, or the like without departing from the scope of the disclosure.

FIG. 9 is another flow diagram 900 illustrating a method for providing the topic view on the electronic device 100, according to an embodiment of the present disclosure.

In an embodiment, at step 902, the method 900 includes detecting an input associated with the topic view. In an embodiment, the electronic device 100 may detect, for example, the user input performed by the user on the topic displayed on the screen of the electronic device 100. In another embodiment, the server 200 may cause detection of the user input performed by the user on the topic of the content displayed on the screen of the electronic device 100.

At step 904, the method 900 includes extracting the at least one of the metadata structure, the token, or the topic distribution vector associated with the topic of the content displayed on the electronic device 100. In an embodiment, the electronic device 100 may extract the at least one of the metadata structure, the token, or the topic distribution vector associated with the topic of the content displayed on the electronic device 100. In another embodiment, the server 200 may extract the at least one of the metadata structure, the token, or the topic distribution vector associated with the topic of the content displayed on the electronic device 100.

At step 906, the method 900 includes determining the degree of similarity by comparing the at least one of metadata structure, token, or topic distribution vector associated with the topic displayed on the electronic device 100 with at least one of the metadata structure, the token, and the topic distribution vector associated with the at least one topic of the content displayed on the at least one other electronic device corresponding to the at least one contact. In an embodiment, the electronic device 100 may determine the degree of similarity by comparing the at least one of metadata structure, token, or topic distribution vector associated with the topic of the content displayed on the electronic device 100 with at least one of the metadata structure, the token, and the topic distribution vector associated with the at least one topic of the content displayed on the at least one other electronic device corresponding to the at least one contact. In another embodiment, the server 200 may determine the degree of similarity by comparing the at least one of metadata structure, token, or topic distribution vector associated with the topic of the content displayed on the electronic device 100 with at least one of the metadata structure, the token, and the topic distribution vector associated with the at least one topic of the content displayed on the at least one other electronic device corresponding to the at least one contact.

At step 908, the method 900 includes determining the at least one similar topic of the content displayed on the at least one other electronic device corresponding to the at least one contact available in the electronic device 100 based on the degree of similarity. In an embodiment, the method allows the electronic device 100 to determine the at least one similar topic of the content displayed on the at least one other electronic device corresponding to the at least one contact available in the electronic device 100 based on the degree of similarity. In another embodiment, the method allows the server 200 to determine the at least one similar topic of the content displayed on the at least one other electronic device corresponding to the at least one contact available in the electronic device 100 based on the degree of similarity.

At step 910, the method 900 includes causing display, on the screen of the electronic device 100, of the topic view comprising the at least one topic indicator indicating the at least one similar topic of the content displayed on the at least one other electronic device corresponding to the at least one contact available in the electronic device 100. In an embodiment, the electronic device 100 may display, on the screen of the electronic device 100, the topic view comprising the at least one topic indicator indicating the at least one similar topic of the content displayed on the at least one other electronic device corresponding to the at least one contact available in the electronic device 100. In another embodiment, the server 200 may cause display, on the screen of the electronic device 100, of the topic view comprising the at least one topic indicator indicating the at least one similar topic of the content displayed on the at least one other electronic device corresponding to the at least one contact available in the electronic device 100.

The various actions, acts, blocks, steps, or the like in the flow chart 900 may be performed in the order presented, in a different order, or simultaneously. Further, in some embodiments, some of the actions, acts, blocks, steps, or the like may be omitted, added, modified, skipped, or the like without departing from the scope of the disclosure.

Unlike conventional systems and methods, the proposed method and system can be used for providing the topic view in the electronic device 100. Further, the topic view comprises content browsed by the contacts similar to the topic browsed by the user in the electronic device 100. The method provides a user experience that allows for communicating socially more with social contacts based on a content of interest. The proposed method can be used for controlling and managing the topic view including notifications and changes to the topic view dynamics.

Figure 10:
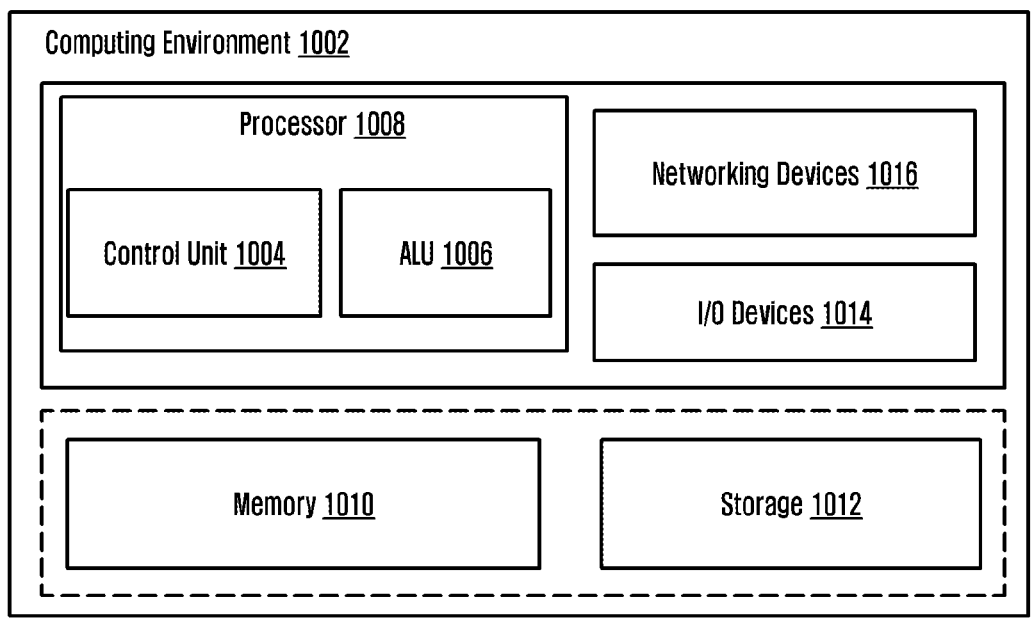
FIG. 10 illustrates a computing environment of the electronic device implementing the method and system for providing a topic view in an electronic device, according to an embodiment of the present disclosure.

FIG. 10 illustrates a computing environment of the electronic device 100 implementing the method and system for providing a topic view in the electronic device, according to an embodiment of the present disclosure. As depicted in FIG. 10, the computing environment 1002 of the electronic device 100 comprises at least one processor 1008 that is equipped with a control unit 1004 and an Arithmetic Logic Unit (ALU) 1006, a memory 1010, a storage unit 1012, a plurality of networking devices 1016, and a plurality of Input output (I/O) devices 1014. The processor 1008 is responsible for processing the instructions of the scheme.

The processor 1008 receives commands from the control unit 1012 in order to perform its processing. Further, any logical and arithmetic operations involved in the execution of the instructions are computed with the help of the ALU 1006.

The overall computing environment 1002 of the electronic device 100 can be composed of multiple homogeneous or heterogeneous cores, multiple CPUs of different kinds, special media, and other accelerators. The processor 1008 is responsible for processing the instructions of the scheme. Further, the plurality of processing units 1008 may be located on a single chip or over multiple chips.

The scheme comprising of instructions and codes required for the implementation are stored in either the memory unit 1010 or the storage 1012 or both. At the time of execution, the instructions may be fetched from the corresponding memory 1010 or storage 1012, and executed by the processor 1008.

In case of any hardware implementations, various networking devices 1016 or external I/O devices 1014 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1 through 10 include blocks which can be at least one of a hardware device, or a combination of hardware devices and software modules.

The foregoing description of the specific embodiments will so fully reveal the general nature of the embodiments herein that others can, by applying current knowledge, readily modify or adapt for various applications such specific embodiments without departing from the generic concept; therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for providing a topic view using an electronic device, the method comprising:
   displaying content on a display of the electronic device;
   detecting, by the electronic device, a gesture input performed by a user on the content displayed on the display of the electronic device prior to the gesture input, wherein the gesture input is a touch input; and
   based on the detecting the gesture input on the content displayed on the display prior to the gesture input, identifying, by the electronic device, a topic of the content displayed on the display of the electronic device prior to the gesture input;
   obtaining, by the electronic device, a degree of similarity between the identified topic of the content displayed on the display of the electronic device prior to the gesture input and at least one topic of at least one webpage that has been browsed on at least one external electronic device that corresponds to at least one contact item stored in the electronic device; and
   displaying, on the display of the electronic device, a topic view based on the degree of similarity,
   wherein the topic view comprises at least one indicator indicating at least one of (i) the at least one contact item or (ii) the at least one topic of the at least one webpage that has been browsed on the at least one external electronic device.

2. The method of claim 1, further comprising:
   storing information regarding the topic view in the electronic device;
   identifying whether the topic view is marked one of dynamic or static; and
   dynamically updating the topic view, based on the topic view being marked as dynamic; or
   retaining the topic view in the electronic device, based on the topic view being marked as static.

3. The method of claim 2, further comprising:
   transmitting at least one of the information regarding the topic view or information regarding whether the topic view is marked as dynamic or static to a server.

4. The method of claim 2, further comprising:
   obtaining a selection of the at least one indicator of the topic view; and
   retaining, based on the selection, the at least one indicator of the topic view based on the topic view being updated.

5. The method of claim 1, wherein the obtaining the degree of similarity comprises:
   transmitting information regarding the content displayed on the electronic device prior to the gesture input to a server;
   obtaining, from the server, at least one of a metadata structure, a token, or a topic distribution vector extracted from the content displayed on the electronic device prior to the gesture input and at least one of a metadata structure, a token, or a topic distribution vector extracted from the at least one webpage that has been browsed on the at least one external electronic device corresponding to the at least one contact item stored in the electronic device;
   identifying the degree of similarity between the at least one of the metadata structure, the token, or the topic distribution vector extracted from the content displayed on the electronic device prior to the gesture input and the at least one of the metadata structure, the token, or the topic distribution vector extracted from the at least one webpage that has been browsed on the at least one external electronic device that corresponds to the at least one contact item stored in the electronic device.

6. The method of claim 1, further comprising:
   identifying whether the identified topic is a shareable topic; and
   transmitting information regarding the content displayed on the electronic device prior to the gesture input to at least one of a server or the at least one external electronic device based on the identified topic being the shareable topic.

7. The method of claim 1, further comprising:
   obtaining a selection of any one of the at least one indicator of the topic view; and
   identifying a main topic of the topic view based on the selection.

8. The method of claim 7, further comprising:
   obtaining a degree of similarity between the main topic of the topic view and the at least one topic of the at least one webpage browsed on the at least one external electronic device that corresponds to the at least one contact item stored in the electronic device; and
   changing the at least one indicator of the topic view based on the degree of similarity between the main topic of the topic view and the at least one topic of the at least one webpage that has been browsed on the at least one external electronic device that corresponds to the at least one contact item stored in the electronic device.

9. The method of claim 1, wherein
   the at least one external electronic device transmits information regarding the at least one webpage that has been browsed based on the at least one webpage being browsed, and
   the obtained degree of similarity is based on one or more tokens extracted based on keyword frequency in at least one of the content displayed on the display prior to the gesture input, or the at least one webpage that has been browsed on the at least one external electronic device.

10. The method of claim 1, further comprising:
    detecting a user input on the displayed topic view; and
    displaying, on the display of the electronic device, a list of topic views corresponding to a group which a user of the electronic device has joined,
    wherein the list of the topic views comprises a number of users of the at least one external electronic device that have joined the group and a number of new content items browsed on the at least one external electronic device that have joined the group.

11. An electronic device for providing a topic view, the electronic device comprising:
    a display; and
    at least one processor configured to:
      control the display to display content;
      detect a gesture input performed by a user on the content displayed on the display prior to the gesture input, wherein the gesture input is a touch input,
      based on the detecting the gesture input on the content displayed on the display prior to the gesture input, identify a topic of the content displayed on the display prior to the gesture input,
      obtain a degree of similarity between the identified topic of the content displayed on the display prior to the gesture input and at least one topic of at least one webpage that has been browsed on at least one external electronic device that corresponds to at least one contact item stored in the electronic device, and control the display to display a topic view based on the degree of similarity, wherein the topic view comprises at least one indicator indicating at least one of (i) the at least one contact item or (ii) the at least one topic of the at least one webpage that has been browsed on the at least one external electronic device.

12. The electronic device of claim 11, wherein the at least one processor is configured to:

extract at least one of a metadata structure, a token, or a topic distribution vector from the content displayed on the display of the electronic device prior to the gesture input; and obtain the degree of similarity between the at least one of the metadata structure, the token, or the topic distribution vector extracted from the content displayed on the display of the electronic device prior to the gesture input and at least one of a metadata structure, a token, or a topic distribution vector extracted from the at least one webpage that has been browsed on the at least one external electronic device that corresponds to the at least one contact item stored in the electronic device.

13. The electronic device of claim 11, wherein the at least one indicator comprises at least one of an image corresponding to the at least one webpage that has been browsed on the at least one external electronic device or an image corresponding to the at least one contact item stored in the electronic device.

14. The electronic device of claim 11, wherein
the electronic device further comprises a memory configured to store information regarding the topic view in the electronic device, and
the at least one processor is further configured to:
identify whether the topic view is marked one of dynamic or static, and
dynamically update the topic view based on the topic view being marked as dynamic, or
retain the topic view in the electronic device based on the topic view being marked as static.

15. The electronic device of claim 14, wherein
the electronic device further comprises a communication interface, and
the at least one processor is further configured to control the communication interface to transmit at least one of the information regarding the topic view or information regarding whether the topic view is marked as dynamic or static to a server.

16. The electronic device of claim 14, wherein the at least one processor is further configured to:
obtain a selection of the at least one indicator of the topic view; and
retain the at least one indicator of the topic view based on the selection based on the topic view being updated.

17. The electronic device of claim 11, further comprising a communication interface,
wherein the at least one processor is further configured to:
control the communication interface to transmit, to a server, information regarding the content displayed on the electronic device prior to the gesture input;
obtain, through the communication interface, at least one of a metadata structure, a token, or a topic distribution vector extracted from the content displayed on the electronic device prior to the gesture input and at least one of a metadata structure, a token, or a topic distribution vector extracted from the at least one webpage that has been browsed on the at least one external electronic device that corresponds to the at least one contact item stored in the electronic device from the server; and
identify the degree of similarity between the at least one of the metadata structure, the token, or the topic distribution vector extracted from the content displayed on the electronic device prior to the gesture input and the at least one of the metadata structure, the token, or the topic distribution vector extracted from the at least one webpage that has been browsed on the at least one external electronic device that corresponds to the at least one contact item stored in the electronic device.

18. The electronic device of claim 11, further comprising a communication interface,
wherein the at least one processor is further configured to:
identify whether the identified topic is a shareable topic; and
control the communication interface to transmit information regarding the content displayed on the electronic device prior to the gesture input to at least one of a server or the at least one external electronic device based on the identified topic being the shareable topic.

19. The electronic device of claim 11, wherein the at least one processor is further configured to:
obtain a selection of any one of the at least one indicator of the topic view; and
identify a main topic of the topic view based on the selection.

20. The electronic device of claim 19, wherein the at least one processor is configured to:
identify a degree of similarity between the main topic of the topic view and the at least one topic of the at least one webpage that has been browsed on the at least one external electronic device corresponding to the at least one contact item stored in the electronic device; and
change the at least one indicator of the topic view based on the degree of similarity between the main topic of the topic view and the at least one topic of the at least one webpage that has been browsed on the at least one external electronic device corresponding to the at least one contact item stored in the electronic device.

* * * * *